H. D. BENNETT.
PRESSURE COUNTERACTING MECHANISM.
APPLICATION FILED MAY 3, 1912.
1,059,022. Patented Apr. 15, 1913.
4 SHEETS—SHEET 2.
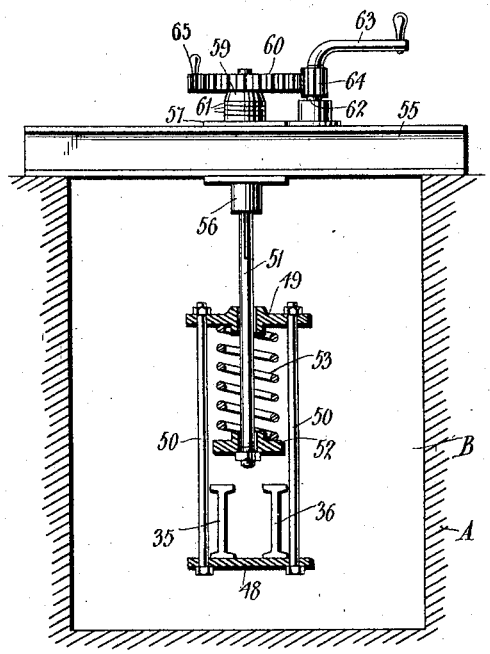
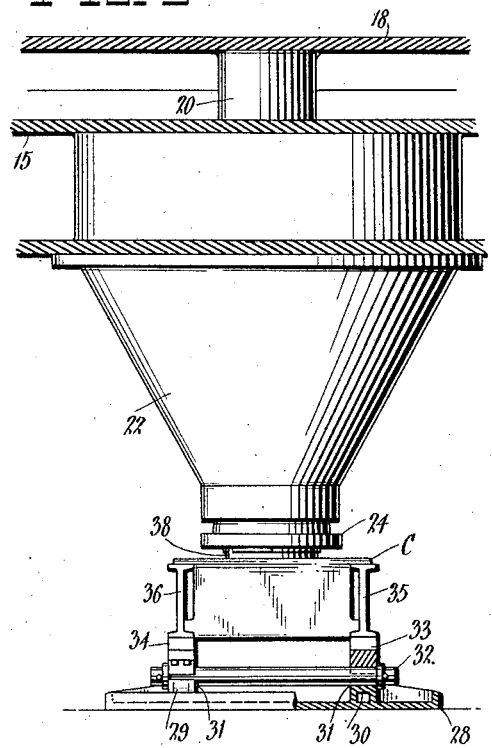
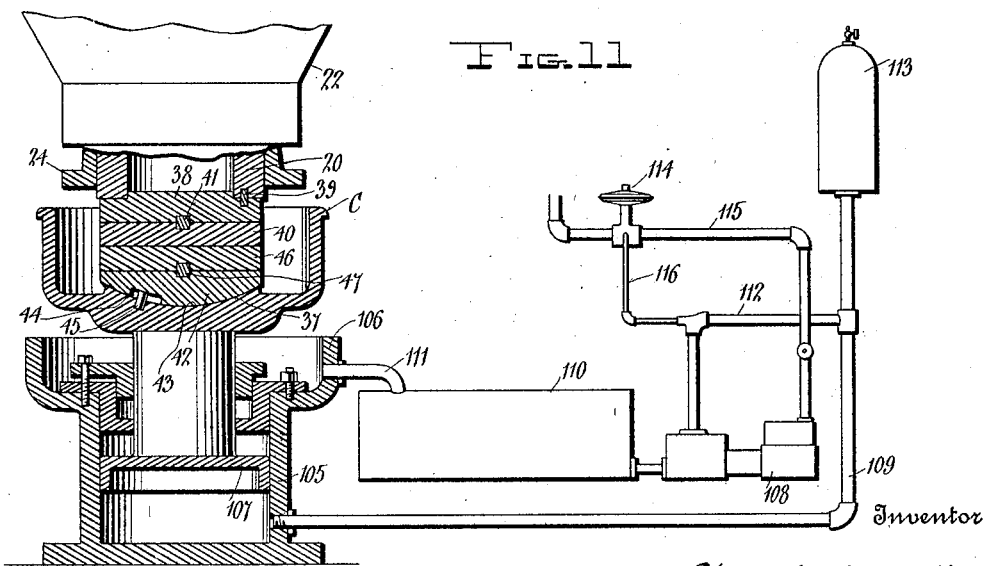
Witnesses
Inventor
Howard D. Bennett
By 
Attorneys

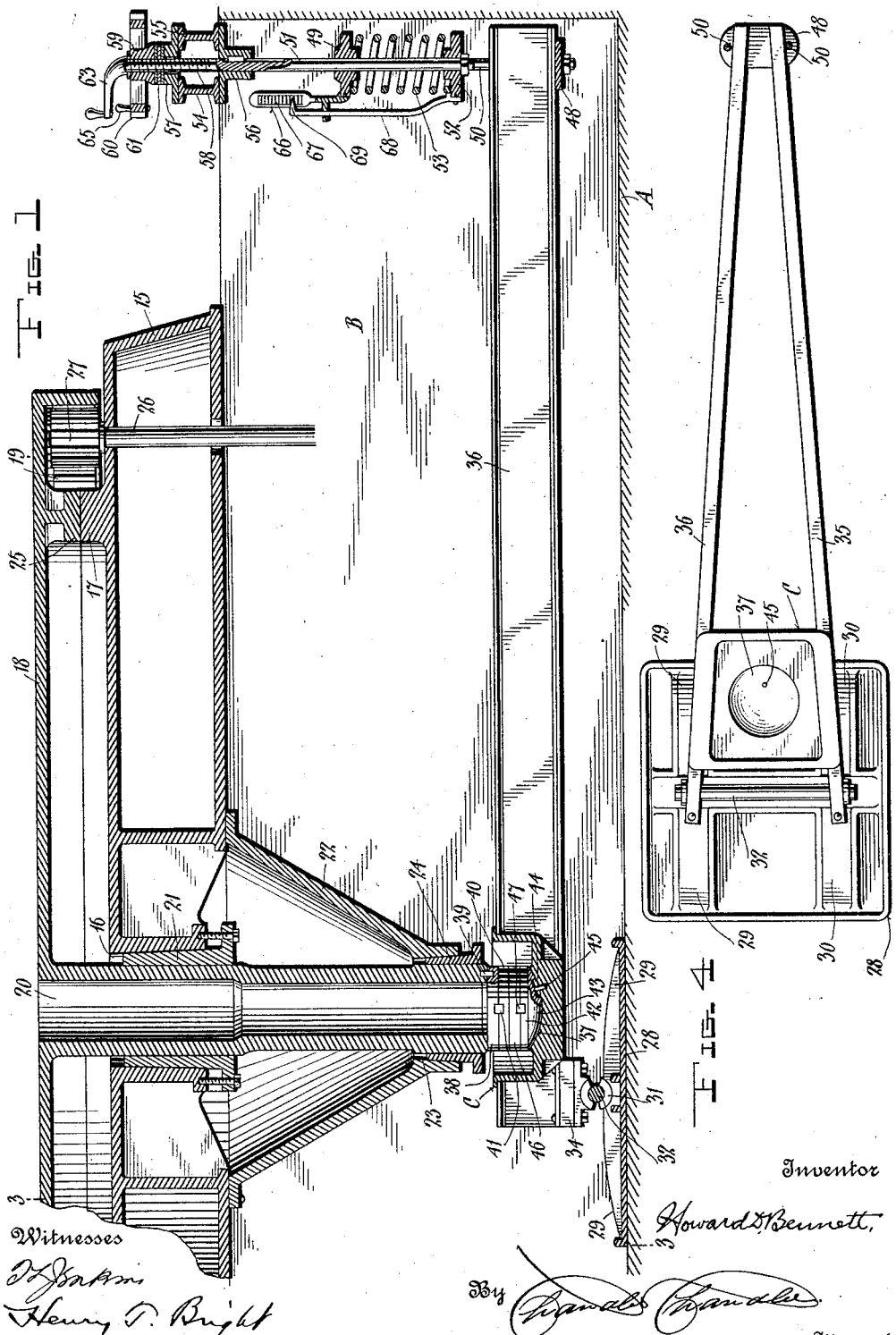

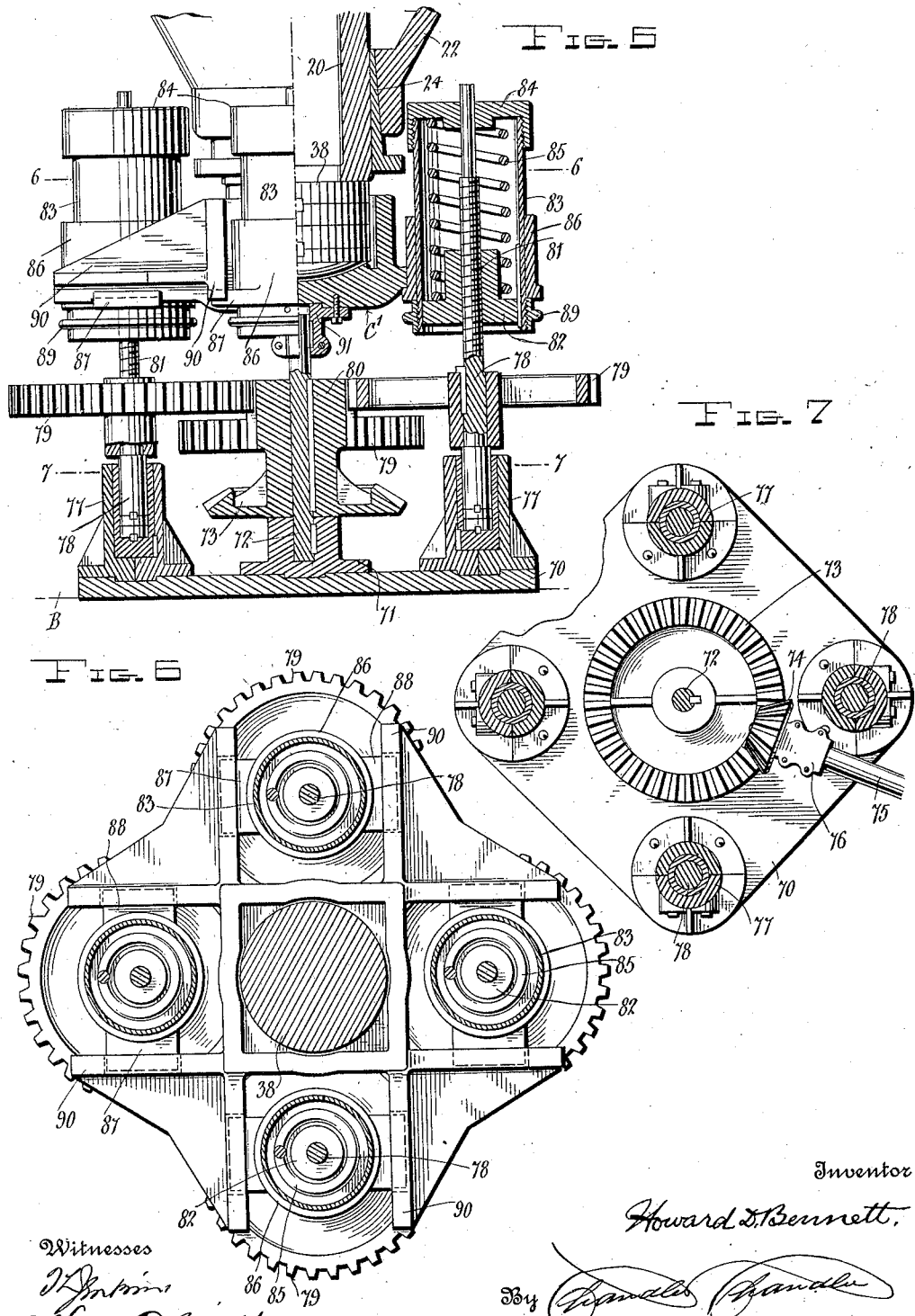

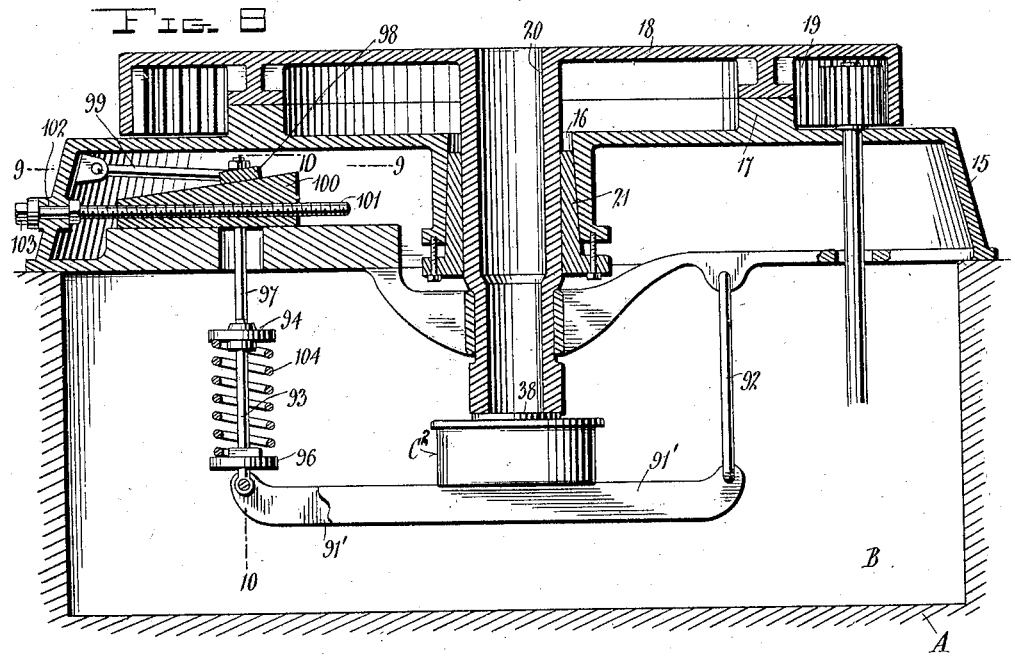

UNITED STATES PATENT OFFICE.

HOWARD D. BENNETT, OF BALTIMORE, MARYLAND.

PRESSURE-COUNTERACTING MECHANISM.

1,059,022.  Specification of Letters Patent.  Patented Apr. 15, 1913.

Application filed May 3, 1912. Serial No. 694,914.

*To all whom it may concern:*

Be it known that I, HOWARD D. BENNETT, a citizen of the United States, residing at Baltimore, State of Maryland, have invented certain new and useful Improvements in Pressure-Counteracting Mechanism; and I do hereby declare the following to be a full, clear, and exact description of the invention, such as will enable others skilled in the art to which it appertains to make and use the same.

This invention relates to pressure counteracting mechanism and particularly to a type adapted for use in connection with boring mills.

The object of the invention resides in the provision of a pressure counteracting mechanism adapted for association with the rotatable work support of a boring mill or other analogous structure to counteract the pressure exerted upon the support during the operation of the latter and thereby reduce the friction between such support and its sustaining means, such reduction of friction serving to eliminate chattering, reduce wear and tear, permit the sustaining means to be constructed of relatively light design, increase the speed of rotation of the support and as a result increase the output of work, reduce the necessity of lubrication to a minimum, decrease the driving power required to operate the support and associated parts, and increase the life of the machine with which the support may be associated.

A further object of the invention resides in the provision of a pressure counteracting mechanism in which the counteracting force exerted thereby may be varied so as to conform with variations in pressure exerted upon the work.

Broadly speaking the invention consists of a yielding or elastic element by which a counteracting force is applied in a fixed or varying degree to reduce the stress exerted by a work support in various ways upon its sustaining means with resultant reduction in friction between the support and its sustaining means and also in the power required to operate the work support.

In describing the invention in detail, reference will be had to the accompanying drawings wherein like characters of reference denote corresponding parts in the several views, and in which—

Figure 1 is a vertical section through the work support of a boring mill showing the pressure counteracting mechanism associated therewith, Fig. 2, an end view of what is shown in Fig. 1 partly in section, Fig. 3, a section on the line 3—3 of Fig. 1, Fig. 4, a plan view of what is shown in Fig. 1 with the work support and its bed plate and also the adjusting means of the pressure counteracting mechanism removed, Fig. 5, a vertical section through the work support and bed plate of a boring mill showing a modified form of pressure counteracting mechanism, Fig. 6, a section on the line 6—6 of Fig. 5, Fig. 7, a section on the line 7—7 of Fig. 5, Fig. 8, a vertical section through the work support and bed plate of a boring mill showing still another modified form of the pressure counteracting mechanism, Fig. 9, a section on the line 9—9 of Fig. 8, Fig. 10, a section on the line 10—10 of Fig. 8, and Fig. 11, a partial vertical section through the work support and bed plate of a boring mill showing another modified construction of pressure counteracting mechanism.

Referring to the drawings A indicates the foundation of a boring mill provided with the usual cavity B in which is disposed portions of the work support of the mill and also portions of the pressure counteracting mechanism as will hereinafter appear.

Supported directly upon the foundation A and spanning a portion of the cavity B is a bed plate 15 provided with a central opening 16 and having formed on the upper side thereof a circular track 17 disposed concentrically to the opening 16. Overlying the upper side of the bed plate 15 is a work support or table 18 of circular formation and having a depending flange around its periphery provided on its inner side with a rack 19. The work support or table 18 is further provided with a centrally disposed depending tubular spindle 20 which extends through the opening 16 and is rotatably mounted therein by means of a heading sleeve 21 suitably secured to the bed plate 15. Suspended from the bed plate 15 within the cavity B is a conical casting 22 the minor or lower end of which is provided with an opening 23 through which the spindle 20 also extends, said spindle also rotating in said opening upon a bearing 24 mounted therein. The inner side of the work support or table 18 is provided with a circular rib 25 engaging the track 17 which latter directly supports said table under normal conditions during the rotation thereof.

Journaled in the bed plate 15 is a vertical shaft 26 which has fixed on its upper end a pinion 27 meshing with the rack 19, of the work support or table. This shaft 26 is rotated through the medium of connections with a suitable driving element (not shown), such rotation of the shaft 26 serving to rotate the work support or table 18 through the pinion 27 and rack 19.

Mounted upon the bottom of the cavity B is a fulcrum base 28 provided adjacent each side with upwardly extending ribs 29 and 30 which are provided centrally with bearings 31. Mounted in the bearings 31 is a roller 32 upon which rest spaced fulcrum bearings 33 and 34 mounted on the terminals of beams 35 and 36 respectively. By this construction it will be apparent that the beams 35 and 36 are fulcrumed at one end leaving the opposite ends of said beams free to move up or down.

Supported between the beams 35 and 36 directly beneath the tubular spindle 20 is a step bearing C which is shown as formed of substantially a cup-shaped casting having its bottom provided interiorly with a concaved or dished central portion 37.

Disposed against the lower end of the spindle 20 is a heel plate 38 which is locked to said spindle for rotation therewith by means of a dowel pin 39. Disposed against the heel plate 38 is a bearing plate 40, said plate 40 being connected to the heel plate 38 for rotation with the latter by means of a key member 41. Seated in the concaved portion 37 is a compensating disk 42, said disk having its lower side convexed as at 43 to correspond with the concaved portion 37. This convexed side of the disk 42 is provided with a recess 44 into which extends a dowel pin 45 mounted in the bottom of the step bearing C. The dowel pin 45 is capable of sufficient play within the recess 44 to allow the disk 42 to shift its position so as to compensate for variations in the position of the step bearings C with respect to the spindle 20. Resting upon the upper side of the disk 42 is a bearing disk 46 which engages the bearing disk 40 and is held against rotation by means of a key connection 47 between same and the compensating disk 42. By this construction it will be apparent that the heel plate 38 and bearing disk 30 will rotate with the spindle 20, while the compensating disk 42 and bearing disk 46 will be held against movement relatively to the step bearing C except for the slight shifting in position permitted by the predetermined play of the dowel pin 45 in the recess 44. During the rotation of the spindle 20 the friction faces between the bearing disks 40 and 46 are constantly maintained in a bath of oil carried within the step bearing C.

While one particular form of bearing for the lower end of the spindle 20 has been illustrated and described it will be apparent that a roller bearing or any other form of bearing may be substituted therefor according to requirements and circumstances.

The ends of the beams 35 and 36 remote from the step bearing C are supported upon a saddle block 48, suspended from a yoke 49 by bridle rods 50. Slidably mounted in the yoke 49 between the bridle rods 50 is a hanger rod 51 which carries on the end thereof adjacent the beams 35 and 36 a cap 52 and between this cap and the yoke 49 is disposed a spiral spring 53, the lower end of this spring bearing against the cap 52 and the upper end against the yoke 49. Supported upon the foundation A and spanning the cavity B are beams 54 and 55, said beams 54 and 55 being disposed directly above the yoke 49 and transversely of the beams 35 and 36. The upper end of the hanger rod 51 is disposed between the beams 54 and 55 and is slidably and nonrotatably mounted in a guide block 56 depending from the lower side of the beams 54 and 55, and is further guided in a block 57 mounted on the upper side of the beams 54 and 55. The extreme upper end of the rod 51 is threaded as at 58 and working on these threads above the block 57 is the hub 59 of a gear wheel 60. Interposed between the adjacent ends of the hub 59 and block 57 is a plurality of bearing disks 51 which serve to lessen the friction incident to the rotation of the gear 60 as will be apparent. Rotatably mounted upon the beams 54 and 55 is a vertical shaft 62 provided with a crank 63 and having fixed thereon a gear 64 meshing with the gear 60 whereby the rotation of the crank 63 will effect a rotation of the gear 60.

Upon the operation of the boring mill should it be found that the pressure exerted upon the work table or support 18 produces too great friction between the track 17 and rib 25 it is only necessary, in order to relieve such condition, to rotate the gear 60 by means of the gear 64 and crank 63 in a direction that will draw the rod 51 upwardly. This upward movement of the rod 51 will in turn move the cap 52 toward the yoke 49 and compress the spring 53. This spring will then react and tend to force the yoke 49 upward and this tendency will in turn be transmitted to the bridle rods 50, saddle block 48, beams 35 and 36 and step bearing C and thus render the mechanism a yielding support for the work table 18, said support exerting an upward pressure on the spindle 20 which will counteract the pressure being exerted upon the work table or support 18 and relieve excessive friction between the track 17 and rib 25. It will be noted that in the event the pressure upon the work table or support 18 is varied the spring 53 may be compressed or released through the medium of the proper rotation of the gear 60 so as to vary the upward pressure exerted on the spindle 20 by the step bearing C to correspond with variations in pressure upon the work table or support 18. In the event a quick adjustment of the spring 53 is desired there is provided on the gear 60 a handle 65 whereby said gear may be rotated independent of the crank 63 and gear 62. In order to determine at a glance the upward pressure being exerted upon the beams 35 and 36 and the step bearing C there is mounted upon the yoke 49 a plate 66 provided with graduations 67, while an arm 68 is mounted upon the cap 52 and has its upper end provided with a laterally directed pointer 69 partially overlying the graduated face of the plate 66. By this construction it will be apparent that as the cap 52 is moved toward and away from the yoke 49 the pointer 69 will move correspondingly over the graduated face of the plate 66, said graduations being so arranged that the reading at the pointer 69 will indicate the magnitude of the counteracting force being exerted through beams 35 and 36 and step bearing C upon the table 18.

In Figs. 5, 6, and 7 there is disclosed a modified construction for carrying the invention into practice. In this form of the invention there is mounted upon the bottom of the cavity B in vertical alinement with the spindle 20 a substantially square base plate 70 which has mounted centrally thereon a vertical bearing 71 and in this bearing is journaled the lower end of a vertical shaft 72. Fixed upon the shaft 72 immediately above the bearing 71 is a beveled gear 73 which meshes with a beveled gear 74 fixed on an operating shaft 75, said operating shaft being journaled in a bracket 76 projecting laterally from the bearing 71 and adapted to be rotated through the medium of connections with a suitable source of power (not shown). Mounted at each corner of the base plate 70 is a vertical bearing 77 and in each of these bearings is journaled the lower end of a vertical shaft 78. Fixed on each shaft 78 above the bearing 77 is a gear 79. The gears 79 all mesh with a pinion 80 fixed on the shaft 72 above the gear 73 and one pair of opposite gears 79 is disposed in a different horizontal plane from the opposite pair of gears 79 in order to allow all of said gears 79 to mesh with the pinion 80 without interference with each other. Each of the shafts 78 is provided with a threaded portion 81 upon which is mounted a head 82, said head being slidably and non-rotatably mounted in a cylindrical tube 83 the upper end of which latter is closed by a cap 84 forming a bearing for the upper end of the shaft 78. Disposed within the tube 83 and encircling the shaft 78 is a spring 85 one end of which bears against the head 82 while the other end thereof bears against the cap 84. Surrounding each tube 83 is a sleeve 86 provided at its lower end with diametrically opposite lateral extensions 87 and 88 for a purpose that will presently appear. The sleeve 86 is held against disengagement from the tube 83 by means of a collar 89 threaded on the lower end of the tube 83 and forming a support for the sleeve. The step bearing C in this form of the invention is provided with four forked extensions 90 which are arranged in diametrically opposite pairs and with the arms of each extension embracing the adjacent tube 83 and resting upon the extensions 87 and 88 respectively. Mounted on the bottom of the step bearing C is a bearing 91 in which is rotatably mounted the upper end of the shaft 72. By this construction it will be apparent that upon the rotation of the shaft 75, the shaft 72 will also be rotated through the medium of the gears 74 and 73 and the rotation of this shaft 72 will in turn rotate the gear 80 and cause a simultaneous rotation of the gears 79. This rotation of the gears 79 in the proper direction will cause the heads 82 to move inward of respective tubes 83 and compress respective springs 85. This compression of the springs 85 will cause same to react and tend to lift the tube 83 upwardly which tendency will be transmitted through the collar 89 and sleeve 86 to the extension 90 and thence to the step bearing C' which will result in said step bearing exerting an upward pressure on the spindle 20 to properly counteract excessive downward pressure exerted upon the work table or support 18.

In the modified form of construction illustrated in Figs. 8, 9 and 10 the step bearing $C^2$ is formed integral with the beam 91' which latter is suspended at one end from the bed plate 15 by means of a link 92. The end of the beam 91' remote from the link 92 is secured to the lower end of a rod 93 and the upper end of this rod 93 has mounted thereon a head 94 for a purpose that will presently appear. This rod 93 extends through and is slidably disposed within an opening 95 of a plate 96 which is supported by means of bridle rods 97 slidably mounted for vertical movement in the bed plate 15 and connected at their upper ends by means of the cross head 98, said cross head being held against excessive lateral movement by means of steadying links 99 which connect same to the bed plate 15. Slidably mounted between the cross head 98 and the adjacent portion of the bed plate 15 is a wedge 100 in which is threaded a lead screw 101. The outer end of this screw is rotatably mounted in a bearing 102 formed on the bed plate 15, while the extreme outer end of said lead screw is squared as at 103 to permit of the application of a wrench for effecting the rotation of said screw. Encircling the rod 93 is a spiral spring 104 one end of which bears against the plate 96 while the other end thereof bears against the head 94. In this form of the invention if it is desired to counteract the pressure exerted upon the work table or support 18 it is only necessary to rotate the screw 101 so as to move the wedge 100 outwardly of the bed plate 15. This movement of said wedge will elevate the yoke 98 and in turn raise the plate 96 through the medium of the bridle rods 97. The upward movement of the plate 96 will compress the spring 104 which will then react and tend to move the head 94 upwardly. This tendency will in turn be transmitted to the beam 91' with the result that the step bearing $C^2$ will exert an upward pressure on the spindle 20 to counteract excessive downward pressure exerted upon the work table or support 18.

In the modified form of construction illustrated in Fig. 11 fluid is utilized for exerting the necessary upward counteracting pressure upon the lower end of the spindle of the work table or support in lieu of a spring. In this construction there is provided a hollow cylindrical member 105 closed at its lower end and having its upper end enlarged as at 106. This member 105 is mounted on the bottom of the cavity B in alinement with the spindle 20 the lower end of which latter is provided with a suitable piston 107 arranged to slide in the lower portion of the cylindrical member 105. The interior of the member 105 below the piston 107 is adapted to be supplied with fluid by means of a pump indicated typically at 108, said fluid being delivered to the interior of the spindle member by a pipe 109. The fluid discharged by the pump 108 is drawn from a suitable reservoir 110 and fluid escaping to the upper side of the piston 107 is adapted to be delivered to said reservoir through a pipe 111 which communicates with the interior of the enlarged portion 106 of the cylindrical member and also with the interior of the reservoir 110. The pipe 109 is extended beyond a branch pipe 112 by which it is connected to the pump and has mounted on the resultant open end thereof an air chamber 113 of the usual and well known construction. A pump governor or discharge pressure regulator 114 is placed in the steam supply pipe leading to the pump and a connection 115 from the regulator to the discharge pipe 109 is made so that when the regulator is set to a given discharge pressure, the pump will be governed as to speed to maintain the given pressure. The air chamber 113 will provide a yielding air cushion which will adjust itself to shocks. In this form of the invention it is only necessary to operate the pump 108 until the pressure of the fluid on the lower side of the piston 107 is sufficient to properly counteract the pressure on the work table or support, and then the regulator 114 is set or adjusted to keep the pressure constant. If a change in the counteracting force is required to suit a change in the load or weight on table 18, it is only necessary to adjust the regulator 114.

What is claimed is:

1. The combination with a work support and its sustaining means, of elastic means for counteracting the working stress between the work support and its sustaining means.

2. The combination with a work support and its sustaining means, of elastic means for counteracting the pressure exerted upon the sustaining means by the work support.

3. The combination with a work support and its sustaining means, of elastic means for counteracting the working stress between the work support and its sustaining means, and means for varying the counteracting force of said elastic means.

4. The combination with a work support and its sustaining means, of elastic means for counteracting the pressure exerted upon the sustaining means by the support, and means for varying the counteracting force of said elastic means.

5. The combination with a work support and its sustaining means, of spring controlled means for counteracting the pressure exerted upon the sustaining means by the work support.

6. The combination with a work support and its sustaining means, of spring controlled means for counteracting the pressure exerted upon the sustaining means by the work support, and means for varying the counteracting force of said spring controlled means.

7. In a boring mill, the combination of a bed plate, a work table rotatably mounted on said bed plate and including a spindle, a yieldingly supported element engaging the lower end of the spindle, and means for forcing said element against the spindle to counteract the pressure exerted upon the bed plate by the work table.

8. In a boring mill, the combination of a bed plate, a work table rotatably mounted on said bed plate, a yieldingly supported element engaging the work table, and means for forcing said element against the work table to counteract the pressure exerted by the latter upon the bed plate.

9. In a boring mill, the combination of a bed plate, a work table rotatably mounted thereon, a yieldingly supported element engaging the work table, means for forcing said element against the work table to counteract the pressure exerted by the latter upon the bed plate, and means for varying the counteracting force exerted by said element.

10. In a boring mill, the combination of a bed plate, a work table rotatably mounted on said bed plate, a fulcrumed lever engaging said work table, and elastic means for forcing said lever against the work table to counteract the pressure exerted by said work table upon the bed plate.

11. In a boring mill, the combination of a bed plate, a work table rotatably mounted on said bed plate, a fulcrumed lever engaging said work table, elastic means for forcing said lever against the table to counteract the pressure exerted by said table upon the bed plate, and means for varying the counteracting force exerted upon said fulcrumed lever by said elastic means.

12. In a boring mill, the combination of a bed plate, a work table rotatably supported on said bed plate and including a spindle, a lever extending transversely of the spindle beneath the latter and having the end thereof adjacent the spindle fulcrumed, a step bearing supported by the lever and operatively engaging the lower end of the spindle, and a yielding hanger supporting the free end of the lever and tending to force the step bearing against the lower end of the spindle to counteract the pressure exerted by the work table upon the bed plate.

13. In a boring mill, the combination of a bed plate, a work table rotatably supported on said bed plate and including a spindle, a lever extending transversely of the spindle beneath the latter and having the end thereof adjacent the spindle fulcrumed, a step bearing supported by the lever and operatively engaging the lower end of the spindle, a yielding hanger supporting the free end of the lever, and means for adjusting said yielding hanger to force the step bearing against the lower end of the spindle to counteract the pressure exerted by the work table upon the bed plate.

14. In a boring mill, the combination of a bed plate, a work table rotatably supported on said bed plate, and including a spindle, a suitable step bearing carrying the said spindle, and supported by a spring constantly tending to force the step bearing against the spindle to counteract the pressure exerted by the work table upon the bed plate.

15. In a boring mill, the combination of a bed plate, a work table rotatably supported on said bed plate, and including a spindle, a suitable step bearing carrying the said spindle, and supported by a spring constantly tending to force the step bearing against the spindle to counteract the pressure exerted by the work table upon the bed plate, and means for adjusting said spring to force the step bearing against the spindle to counteract the pressure exerted by the work table upon the bed plate.

In testimony whereof, I affix my signature, in presence of two witnesses.

HOWARD D. BENNETT.

Witnesses:
FRANCIS BOYLE,
H. M. POPHAM.

---

Copies of this patent may be obtained for five cents each, by addressing the "Commissioner of Patents, Washington, D. C."